Patented Mar. 30, 1937

2,075,043

UNITED STATES PATENT OFFICE 2,075,043

A PROCESS FOR PRODUCING A COPPER PHTHALOCYANINE COMPOUND

Reginald Patrick Linstead and Arthur Reginald Lowe, London, Isidor Morris Heilbron, Manchester, and Francis Irving, Grangemouth, England, assignors to Imperial Chemical Industries Limited, a corporation of Great Britain No Drawing. Application April 2, 1934, Serial No. 718,742. In Great Britain April 22, 1933

4 Claims. (Cl. 260—12)

This invention relates to the production of coloring matters of the phthalocyanine type.

In copending application Serial No. 698,216, by three of us (Heilbron, Irving and Linstead), there is described the production of coloring matters of phthalocyanine type by a process which comprises submitting an o-arylenedicyanide, for example phthalonitrile to the action of heat and/or suitable reagents. The invention therein was said to be applicable to o-arylenedicyanides of the benzene, naphthalene or anthracene series.

According to the present invention we prepare the same or similar coloring matters by reacting an arylmononitrile carrying in ortho position to the nitrile group, a halogen or other readily replaceable substituent, and a metallic cyanide.

According to a further feature of the invention, we use instead of an arylnitrile, a corresponding compound, such as an amide, carrying instead of a nitrile group a group adapted to give a nitrile group under the action of heat.

In carrying the invention into effect we heat an o-halogen-benzonitrile or o-halogenbenzamide with a metal cyanide such as cuprous cyanide, conveniently in a suitable medium such as pyridine, in a closed vessel.

The following examples in which parts are by weight illustrate, but do not limit the invention.

Example I

A mixture of 10 parts o-chlorobenzonitrile, 6.5 parts cuprous cyanide and 10 parts pyridine are heated in a sealed vessel for 5 hours at 200° C. The product is treated with hot alcohol to remove residual nitrile, then with ammonia to remove copper cyanide, and then with hydrochloric acid and then with dilute alkali. The residual product is obtained in very fine purple needles, and appears to be copper phthalocyanine.

Example II 24 parts of o-chlorobenzamide and 5 parts of cuprous cyanide are heated for 3 hours at 260–270° C., and the resulting product extracted successively with hot alcohol, ammonia, dilute acid, dilute alkali and hot alcohol. A residue of lustrous purple needles is obtained, which appears to be copper phthalocyanine.

In the above examples quinoline may be used as liquid medium instead of pyridine.

It will be understood that our invention is susceptible to variations within wide limits, without departing from the spirit thereof.

We claim:

1. The process of producing a coloring matter of the phthalocyanine series which comprises heating an ortho-halogenbenzamide with a copper cyanide.

2. The process of producing a coloring matter of the phthalocyanine series which comprises heating ortho-chlorobenzamide and cuprous cyanide in the absence of basic diluents at a temperature of about 260 to about 270° C., and separating the reaction product from unchanged initial material and intermediate reaction products.

3. The process of producing a coloring matter of the phthalocyanine series which comprises heating substantially 24 parts of ortho-chlorobenzamide and 5 parts of cuprous cyanide at a temperature of from 260 to 270° C. for several hours in the absence of basic diluents, and extracting the reaction mass successively with alcohol, ammonia, dilute acid and dilute alkali, to remove residual initial material and intermediate reaction products.

4. The process of producing a coloring matter of the phthalocyanine series which comprises heating an ortho-halogenbenzamide with a copper cyanide in the absence of basic diluents.

REGINALD PATRICK LINSTEAD.
ARTHUR REGINALD LOWE.
ISIDOR MORRIS HEILBRON.
FRANCIS IRVING.